US011162350B2

(12) United States Patent
Dunbar

(10) Patent No.: US 11,162,350 B2
(45) Date of Patent: Nov. 2, 2021

(54) EARTH-BORING DRILL BIT WITH MECHANICALLY ATTACHED STRAIN PUCK

(71) Applicant: Halliburton Energy Services, Inc., Houston, TX (US)

(72) Inventor: Bradley David Dunbar, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 63 days.

(21) Appl. No.: 16/668,671

(22) Filed: Oct. 30, 2019

(65) Prior Publication Data

US 2021/0131264 A1 May 6, 2021

(51) Int. Cl.
| | | |
|---|---|---|
| *E21B 47/01* | (2012.01) | |
| *E21B 44/02* | (2006.01) | |
| *E21B 10/42* | (2006.01) | |
| *E21B 47/007* | (2012.01) | |
| *G01L 1/22* | (2006.01) | |
| *E21B 47/26* | (2012.01) | |

(52) U.S. Cl.
CPC ............ *E21B 47/007* (2020.05); *E21B 47/01* (2013.01); *E21B 47/26* (2020.05); *G01L 1/22* (2013.01)

(58) Field of Classification Search
CPC ...... E21B 47/01; E21B 47/013; E21B 44/005; E21B 44/02; E21B 10/42; E21B 12/00; E21B 12/02
See application file for complete search history.

(56) References Cited

U.S. PATENT DOCUMENTS

| 3,968,473 A | 7/1976 | Patton et al. | |
| 6,957,575 B2 * | 10/2005 | Boucher | E21B 44/00 |
| | | | 73/152.48 |
| 7,168,506 B2 * | 1/2007 | Boucher | E21B 47/01 |
| | | | 175/48 |
| 7,604,072 B2 | 10/2009 | Pastusek et al. | |
| 7,849,934 B2 * | 12/2010 | Pastusek | E21B 47/00 |
| | | | 175/45 |
| 8,100,196 B2 * | 1/2012 | Pastusek | E21B 21/08 |
| | | | 175/40 |
| 8,162,077 B2 * | 4/2012 | Glasgow | E21B 47/01 |
| | | | 175/40 |
| 8,245,792 B2 | 8/2012 | Trinh et al. | |
| 8,573,326 B2 * | 11/2013 | Trinh | G01L 5/0066 |
| | | | 175/40 |
| 8,967,295 B2 * | 3/2015 | Habernal | E21B 47/01 |
| | | | 175/40 |

(Continued)

FOREIGN PATENT DOCUMENTS

WO WO2010144538 A2 12/2010

*Primary Examiner* — Kenneth L Thompson
(74) *Attorney, Agent, or Firm* — Thomas Rooney; Baker Botts L.L.P.

(57) ABSTRACT

The present disclosure relates to a downhole drilling tool that may include: an earth-boring drill bit including: a bit body; a shank coupled to the bit body; a strain puck removably coupled to the earth-boring drill bit, the strain puck including a strain gauge to collect data indicating a downhole force applied to the earth-boring drill bit during a drilling operation; and a plurality of blades disposed on exterior portions of the bit body, each blade having respective cutting elements disposed thereon.

20 Claims, 6 Drawing Sheets

(56) References Cited

U.S. PATENT DOCUMENTS

| | | |
|---|---|---|
| 9,121,258 B2 | 9/2015 | Kumar |
| 9,297,248 B2 | 3/2016 | Yao |
| 9,372,124 B2 | 6/2016 | Schlosser |
| 9,458,714 B2 * | 10/2016 | Gajji ................... E21B 49/003 |
| 2011/0024188 A1 | 2/2011 | Wassell et al. |
| 2013/0105221 A1 * | 5/2013 | Wassell .................. E21B 44/04 |
| | | 175/40 |
| 2018/0066513 A1 | 3/2018 | Sugiura et al. |
| 2021/0131263 A1 * | 5/2021 | Dunbar .................. E21B 12/00 |

* cited by examiner

EARTH-BORING DRILL BIT WITH MECHANICALLY ATTACHED STRAIN PUCK

TECHNICAL FIELD

The present disclosure relates generally to downhole drilling tools, and in particular to an earth-boring drill bit with a mechanically attached strain puck.

BACKGROUND

Wellbores are formed in geological formation using earth-boring drill bits. Cutting action associated with such drill bits generally requires weight on bit (WOB) and rotation of associated cutting elements (e.g., blades and cutters). Contact between the cutting elements and downhole formations apply various forces on drill bits, for example, compression and bending forces, for example that may result in worn or fatigued cutting elements and scrapped bits. As a result, sensors may be used to collect data indicating forces downhole such that the data may be analyzed to limit the amount of forces applied to drill bits within a wellbore.

BRIEF DESCRIPTION OF THE DRAWINGS

A more complete understanding of the present disclosure and its features and advantages thereof may be acquired by referring to the following description, taken in conjunction with the accompanying drawings, which are not necessarily to scale, in which like reference numbers indicate like features, and wherein.

DETAILED DESCRIPTION

The present disclosure relates to a downhole drilling tool that includes one or more mechanically attached strain pucks. Each strain puck includes strain gauges disposed on the surface of the strain puck that collects data indicating downhole forces applied to the downhole drilling tool and transmits data indicating the downhole forces. The strain pucks may be associated with the downhole drilling tool such that the downhole forces applied to the downhole drilling tool are similarly applied to each strain puck and, in turn, to the strain gauges thereon. Each strain puck is removably coupled to the downhole drilling tool by a puck wedge. Each puck wedge may include threads used to releasably engage the strain puck to the downhole drilling tool such that the strain puck may be removed from the downhole drilling tool without damaging the strain gauges. Data transmitted from the strain gauges may be received by a receiver in real-time and analyzed to identify downhole forces applied to the downhole drilling tool during a drilling operation. The identified forces may be used to modify downhole drilling parameters in order to reduce the magnitude of the downhole forces. Data may also be stored in the downhole drilling tool and received at a time subsequent to the drilling operation.

There are numerous ways in which strain pucks may be implemented in a downhole drilling system. Thus, embodiments of the present disclosure and its advantages are best understood by referring to FIGS. 1 through 7, where like numbers are used to indicate like and corresponding parts.

Figure 1:
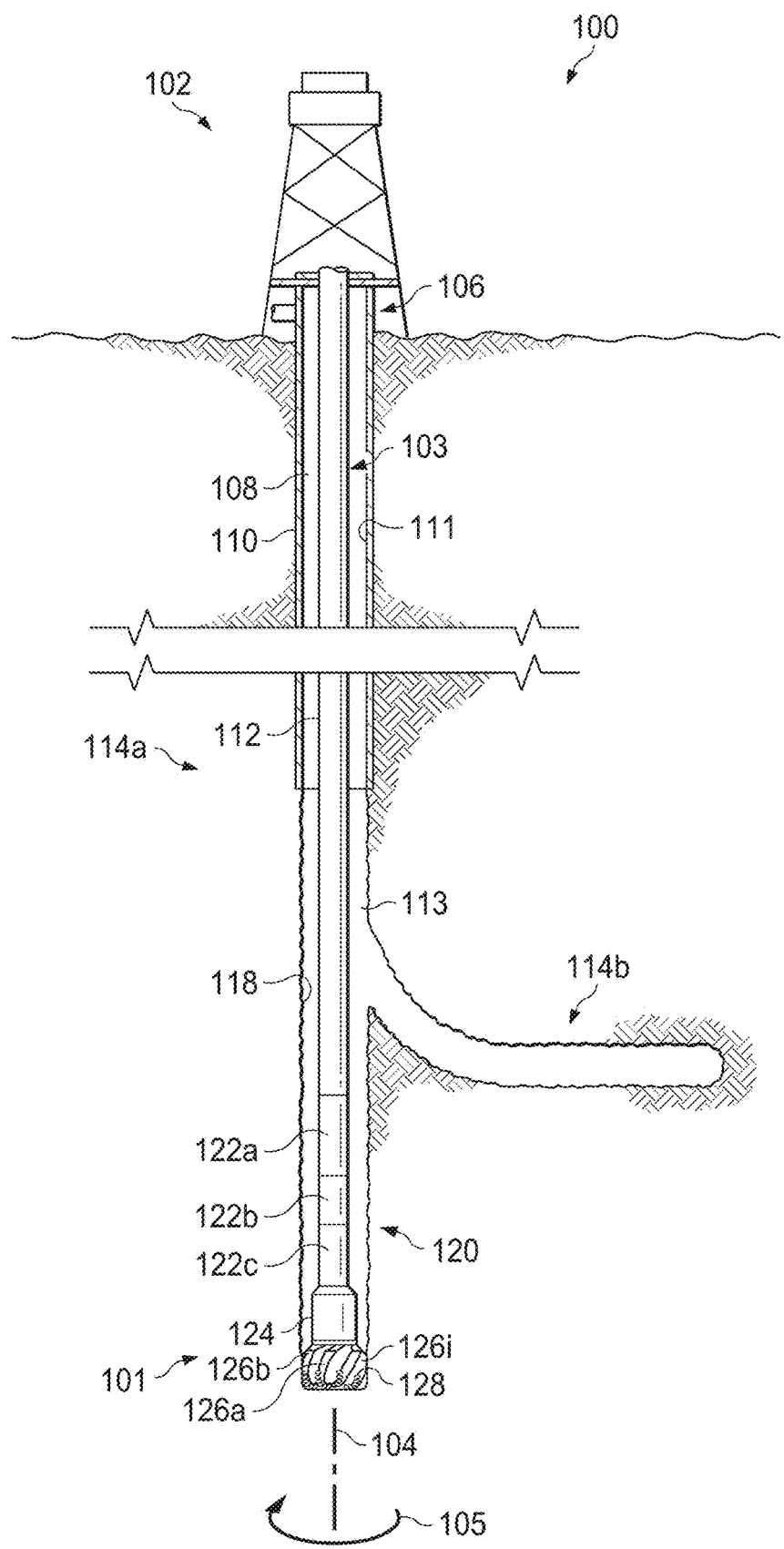
FIG. 1 is a schematic diagram of an example of a drilling system in which a downhole drilling tool of the present disclosure may be used.

FIG. 1 is a schematic diagram of an example of a drilling system in which a downhole drilling tool of the present disclosure may be used. Drilling system 100 may be configured to drill into one or more geological formations to form a wellbore. Drilling system 100 may include a downhole drilling tool according to the present disclosure.

Drilling system 100 may include well surface or well site 106. Various types of drilling equipment such as a rotary table, mud pumps and mud tanks (not expressly shown) may be located at a well surface or well site 106. For example, well site 106 may include drilling rig 102 that may have various characteristics and features associated with a "land drilling rig." However, downhole drilling tools according to the present disclosure may be satisfactorily used with drilling equipment located on offshore platforms, drill ships, semi-submersibles and drilling barges (not expressly shown).

Drilling system 100 may include drill string 103 associated with a downhole drilling tool that is used to form a wide variety of wellbores or bore holes such as generally vertical wellbore 114a or generally horizontal wellbore 114b as shown in FIG. 1. Various directional drilling techniques and associated components of bottom hole assembly (BHA) 120 of drill string 103 may be used to form generally horizontal wellbore 114b. For example, lateral forces may be applied to downhole drilling tool proximate kickoff location 113 to form generally horizontal wellbore 114b extending from generally vertical wellbore 114a. Wellbore 114 is drilled to a drilling distance, which is the distance between the well surface and the furthest extent of wellbore 114, and which increases as drilling progresses.

BHA 120 may be formed from a wide variety of subassemblies configured to form a wellbore 114. For example, subassemblies 122a, 122b and 122c (collectively referred to herein as "subassemblies 122") of BHA 120 may include, but are not limited to, a drill bit, such as earth-boring drill bit 101, drill collars, rotary steering tools, directional drilling tools, downhole drilling motors, reamers, hole enlargers or stabilizers. Subassemblies 122 may also include one or more elements of an electronic package used to monitor and analyze downhole forces applied to downhole drilling tool. For example, the electronic package may include elements such as an accelerometer, a gyroscope, a magnetometer, a memory medium, and a central processing unit (CPU). One or more of the electronic packages in subassemblies 122 may include one or more strain pucks (not expressly shown). In one example, one or more strain pucks may be positioned within one or more subassemblies 122 of BHA 128. While multiple subassemblies 122 are shown, BHA 128 may alternatively include a single assembly.

Wellbore 114 may be defined in part by casing string 110 that may extend from well site 106 to a selected downhole location. Portions of wellbore 114 as shown in FIG. 1 that do not include casing string 110 may be described as "open hole." Various types of drilling fluid may be pumped from well site 106 through drill string 103 to an attached earth-boring drill bit 101. Such drilling fluids may be directed to flow from drill string 103 to respective nozzles (item 156 illustrated in FIG. 2) included in earth-boring drill bit 101. The drilling fluid may be circulated back to well surface 106 through annulus 108 defined in part by outside diameter 112 of drill string 103 and inside diameter 118 of wellbore 114. Inside diameter 118 may be referred to as the "sidewall" of wellbore 114. Annulus 108 may also be defined by outside diameter 112 of drill string 103 and inside diameter 111 of casing string 110.

The terms "uphole" and "downhole" may be used herein to describe the location of various components of drilling system 100 relative to the bottom or end of wellbore 114 shown in FIG. 1. For example, a first component described as uphole from a second component may be further away from the end of wellbore 114 than the second component. Similarly, a first component described as being downhole from a second component may be located closer to the end of wellbore 114 than the second component.

Figure 2:
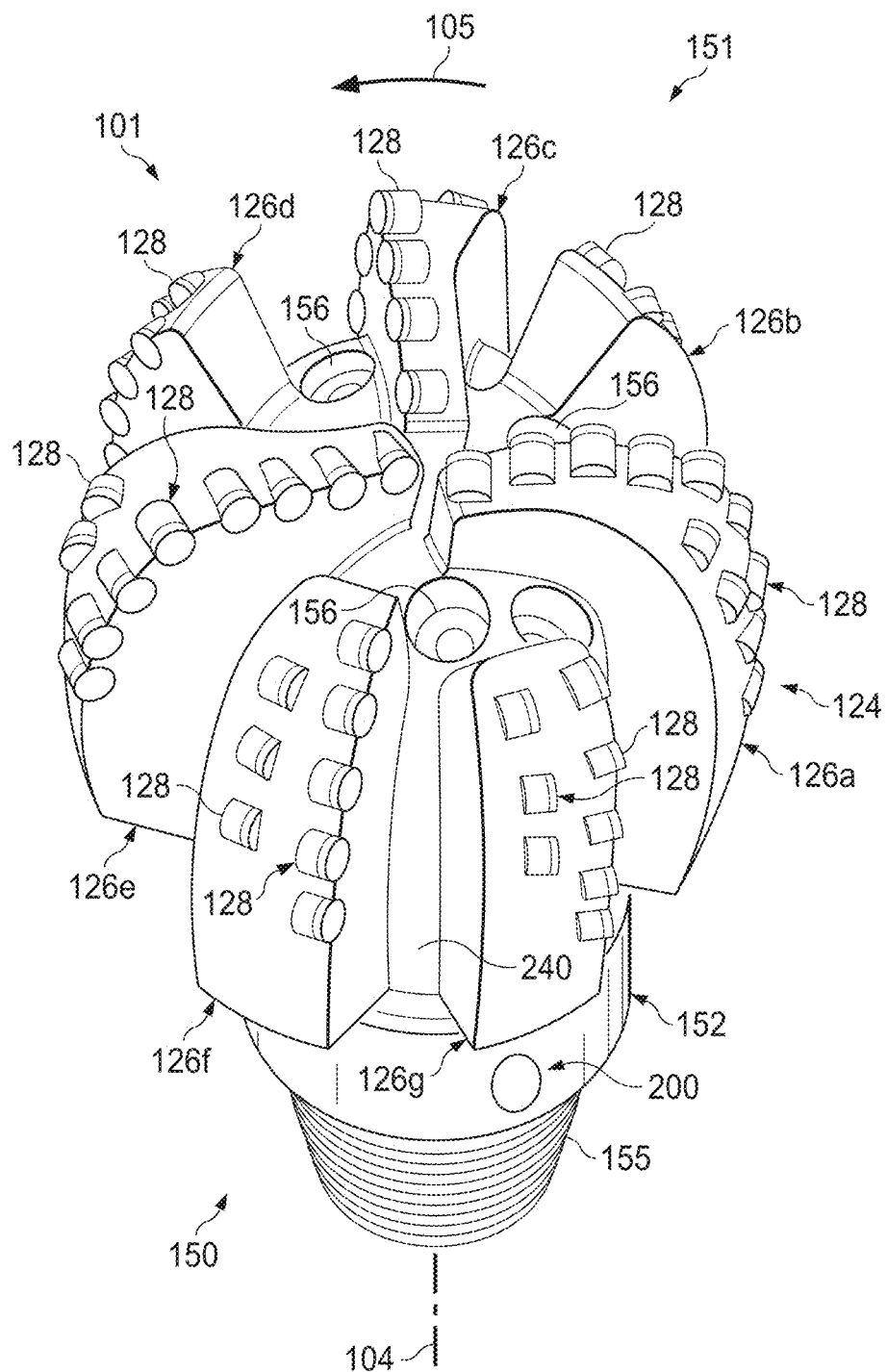
FIG. 2 is an isometric view of an example of an earth-boring drill bit.

FIG. 2 is an isometric view of an example drill bit. Fixed-cutter earth-boring drill bit 101 is oriented upwardly in a manner often used to model or design drill bits. Earth-boring drill bit 101 may be used to form wellbore 114 as shown in FIG. 1 extending through one or more downhole formations. Earth-boring drill bit 101 may be designed and formed in accordance with teachings of the present disclosure and may have many different designs, configurations, and/or dimensions according to the particular application of earth-boring drill bit 101. Although a fixed-cutter earth-boring drill bit is used throughout this specification to illustrate the principles disclosed herein, these principles may be applied, using the description provided herein, by one of ordinary skill in the art to other types of downhole drilling tools that cut into a formation, such as roller cone drill bits, coring bits, and/or reamers.

Earth-boring drill bit 101 includes one or more blades 126 (e.g., blades 126a-126g) that may be disposed outwardly from exterior portions of rotary bit body 124 of earth-boring drill bit 101. Rotary bit body 124 may have a generally cylindrical body and blades 126 may be any suitable type of projections extending outwardly from rotary bit body 124. For example, a portion of blade 126 may be directly or indirectly coupled to an exterior portion of bit body 124, while another portion of blade 126 may be projected away from the exterior portion of bit body 124. Blades 126 formed in accordance with teachings of the present disclosure may have a wide variety of configurations including substantially arched, helical, spiraling, tapered, converging, diverging, symmetrical, and/or asymmetrical.

Each of blades 126 may include a first end disposed proximate or toward bit rotational axis 104 and a second end disposed proximate or toward outer portions of earth-boring drill bit 101 (e.g., disposed generally away from bit rotational axis 104 and toward uphole portions of earth-boring drill bit 101). Earth-boring drill bit 101 may rotate with respect to bit rotational axis 104 in a direction defined by directional arrow 105.

Each blade 126 may have a leading (or front) exterior surface disposed on one side of the blade in the direction of rotation of earth-boring drill bit 101 and a trailing (or back) exterior surface disposed on an opposite side of the blade away from the direction of rotation of earth-boring drill bit 101. Blades 126 may be positioned along bit body 124 such that they have a spiral configuration relative to rotational axis 104. Blades 126 may also be positioned along bit body 124 in a generally parallel configuration with respect to each other and bit rotational axis 104.

Blades 126 may include one or more cutting elements 128 disposed outwardly from the exterior surface of each blade 126. For example, a portion of cutting element 128 may be directly or indirectly coupled to an exterior surface of blade 126 while another portion of cutting element 128 may be projected away from the exterior surface of blade 126. Cutting elements 128 may be any suitable device configured to cut into a formation, including primary cutting elements, backup cutting elements, secondary cutting elements, or any combination thereof. By way of example and not limitation, cutting elements 128 may be various types of cutters, compacts, buttons, inserts, and gage cutters satisfactory for use with a wide variety of earth-boring drill bits 101.

Cutting elements 128 may include respective substrates with a layer of hard cutting material disposed on one end of each respective substrate. The hard layer of cutting elements 128 may provide a cutting surface that may engage adjacent portions of a downhole formation to form wellbore 114 as shown in FIG. 1. The contact of the cutting surface with the formation may form a cutting zone associated with each of cutting elements 128. The edge of the cutting surface located within the cutting zone may be referred to as the cutting edge of a cutting element 128.

Each substrate of cutting elements 128 may have various configurations and may be formed from tungsten carbide or other materials associated with forming cutting elements for earth-boring drill bits. Tungsten carbides may include mono-tungsten carbide (WC), ditungsten carbide ($W_2C$), macrocrystalline tungsten carbide, and cemented or sintered tungsten carbide. Substrates may also be formed using other hard materials, which may include various metal alloys and cements such as metal borides, metal carbides, metal oxides and metal nitrides. Similar materials may be used for rolling elements or hardened portions of walled retainer described herein. For some applications, the hard cutting layer of a cutting element 128 may be formed from substantially the same materials as the substrate. In other applications, the hard cutting layer may be formed from different materials than the substrate. Examples of materials used to form hard cutting layers may include polycrystalline diamond materials, including synthetic polycrystalline diamonds and thermally stable polycrystalline diamond tables.

Uphole end 150 of earth-boring drill bit 101 may include shank 152 with drill pipe threads 155 formed thereon. Threads 155 may be used to releasably engage earth-boring drill bit 101 with BHA 120, described in detail below, whereby earth-boring drill bit 101 may be rotated relative to bit rotational axis 104. Downhole end 151 of earth-boring drill bit 101 may include a plurality of blades 126a-126g with respective junk slots or fluid flow paths 240 disposed therebetween. Additionally, drilling fluids may be communicated to one or more nozzles 156.

Earth-boring drill bit 101 may also include strain puck 200. Strain puck 200 may be removably coupled to earth-boring drill bit 101 using a puck wedge (not expressly shown). More specifically, the puck wedge may include threads to be received by a threaded portion of earth-boring drill bit 101 such that a tightening force may be applied radially inward (i.e., toward shank 152) upon strain puck 200 thereby removably coupling strain puck 200 to earth-boring drill bit 101. In the example show in FIG. 2, strain puck 200 may be positioned within a recessed area, or pocket, located within an exterior surface of shank 152.

Strain puck 200 may be positioned within the recessed area of shank 152 such that a surface of strain puck 200 may include strain gauges that face radially outward from shank 152 and bit rotational axis 104 to collect data indicating downhole forces applied to earth-boring drill bit 101. In particular, downhole forces applied to shank 152 of earth-boring drill bit 101 may be similarly applied to strain puck 200 and, in turn, to the strain gauges disposed thereon. Shank 152 may include one or more strain pucks 200. For example, two strain pucks 200 may be disposed within shank 152 at locations approximately 180 degrees from one another to collect data indicating compression and bending forces applied to shank 152 during a drilling operation. The number of strain pucks 200 coupled to shank 152 may depend upon anticipated downhole drilling conditions and/or the type of downhole forces for which data is to be collected. In other examples, one or more strain pucks 200 may be removably coupled to roller cone drill bits, coring bits, and/or reamers in the manner described above.

In one example, one or more strain pucks 200 may be disposed within one or more junk slots and/or fluid flow paths 240 of earth-boring drill bit 101. In particular, one or more strain pucks 200 may be positioned such that downhole forces applied to junk slots and/or fluid flow paths 240 may be similarly applied to strain pucks 200 and, in turn, to the strain gauges disposed thereon. In another example, one or more strain pucks 200 may be disposed on one or more blades 126 of earth-boring drill bit 101 such that downhole forces applied to each of the one or more blades 126 may be similarly applied to strain puck 200 and to the strain gauges disposed thereon. In each of the examples described above, strain gauges disposed on strain puck 200 may include transmitters used to transmit data indicating downhole forces to one or more receivers such that the data from each strain gauge may be analyzed.

Figure 3:
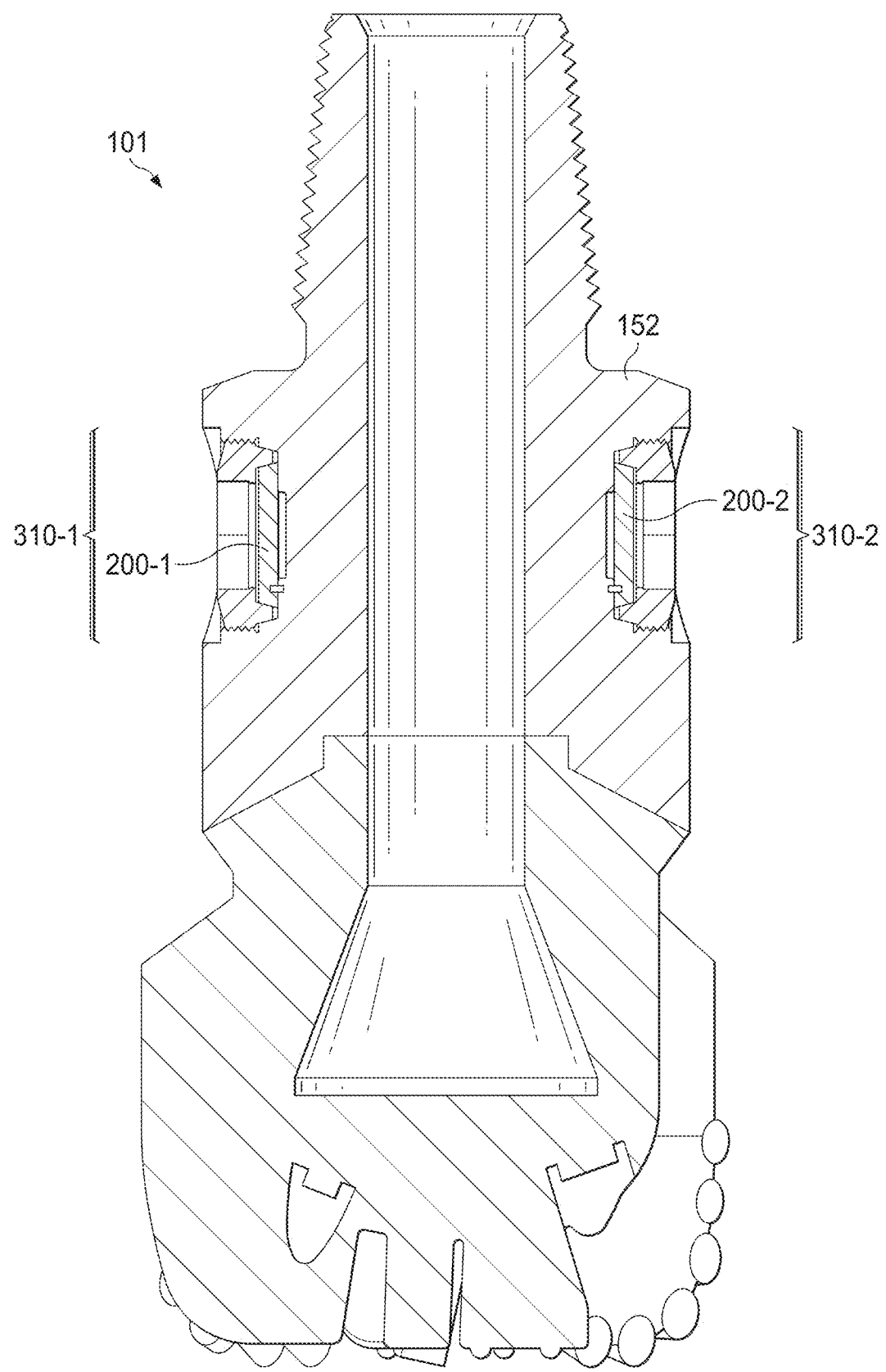
FIG. 3 is a cross-sectional view of an example of an earth-boring drill bit having a shank that includes two strain pucks.

FIG. 3 is a cross-sectional view of an example of an earth-boring drill bit having a shank that includes two strain pucks. In the example illustrated in FIG. 3, shank 152 of earth-boring drill bit 101 includes two strain pucks 200-1 and 200-2 disposed approximately 180 degrees from one another within recessed areas 310-1 and 310-2. Each strain puck 200 includes strain gauges. Strain gauges disposed on each strain puck 200 may collect data indicating downhole forces applied to earth-boring drill bit 101 during a drilling process. In particular, downhole forces applied to shank 152 of earth-boring drill bit 101 may be similarly applied to each strain puck 200 and, in turn, to the strain gauges disposed thereon.

Each strain gauge may transmit data indicating downhole forces to one or more receivers such that the data from each strain gauge may be analyzed. Specifically, strain gauges on each strain puck 200 may collect data indicating compression forces, bending forces, and torsional forces applied to each strain puck 200 during a drilling operation and may transmit the collected data in real-time. This data may be received by a receiver for real-time analysis or stored in a memory medium within earth-boring drill bit 101 for analysis at a later time.

Analysis of data received from strain gauges may suggest ways in which one or more downhole drilling parameters may be modified to reduce the magnitude of the downhole forces applied to earth-boring drill bit 101. Examples of the downhole drilling parameters may include rotational speed of the earth-boring drill bit in revolutions per minute (RPM), a rate of penetration (ROP), a weight on bit (WOB), a torque on bit (TOB), and a depth-of-cut control (DOCC). The rate of penetration (ROP) of earth-boring drill bit 101 may be a function of both weight on bit (WOB) and revolutions per minute (RPM). Referring back to FIG. 1, drill string 103 may apply weight on earth-boring drill bit 101 and may also rotate earth-boring drill bit 101 about rotational axis 104 to form wellbore 114 (e.g., wellbore 114a or wellbore 114b). The depth-of-cut per revolution may also be based on ROP and RPM of a particular bit and indicates how deeply drill bit cutting elements 128 shown in FIG. 2 are engaging the formation. An analysis of the data received from strain gauges may indicate which of the downhole drilling parameters may be causing or contributing to compression forces, bending forces, and/or torsional forces applied to strain pucks 200-1 and 200-2 during a drilling process.

In the example shown in FIG. 3, strain pucks 200-1 and 200-2 may be disposed approximately 180 degrees from one another, data received from strain gauges disposed on each strain puck 200 may be used simultaneously for analysis to determine downhole forces being applied to both sides of shank 152 (e.g., compression or bending). In one instance, data indicating compression forces applied to both strain pucks 200-1 and 200-2 may be analyzed to calculate the weight on bit (WOB) based on a compression value from strain puck 200-1 and a compression value from strain puck 200-2. In another instance, a bending value may be calculated based on a compression value from one strain puck 200-1 and a tension value (i.e., indicating a tensile force) from the other strain puck 200-2. In yet another instance, a torque on bit (TOB) value may be calculated based on torsion value (i.e., indicating a torsional force) applied to both strain pucks 200-1 and 200-2. In another example, earth-boring drill bit 101 may include three strain pucks 200 disposed 120 degrees from one another. In yet another example, earth-boring drill bit 101 may include four strain pucks 200 disposed 90 degrees from one another. In each of these examples, data received from strain gauges disposed on each strain puck 200 may be used simultaneously for analysis to determine downhole forces being applied to shank 152, for example, to identify a direction of a bending force and/or to determine whether a torsional force is symmetric around shank 152.

Values indicating WOB, bending, and TOB may be used to determine a set of optimized downhole drilling parameters in order to extend the lifetime of the downhole drilling tool and/or perform more efficient drilling operations. In particular, if WOB exceeds an adjustable threshold, compression forces applied to the downhole drilling tool may damage the downhole drilling tool or result in inefficient drilling operations. Accordingly, WOB may be modified such that WOB is within the adjustable threshold. Similarly, if a bending value exceeds an adjustable threshold, bending forces may damage the downhole drilling tool or drill string 103 of drilling system 100 illustrated in FIG. 1, for example. In response, the bending value may be modified such that the bending value is within the adjustable threshold, thereby reducing the bending forces applied to the downhole drilling tool. Lastly, if TOB exceeds an adjustable threshold, the TOB may be modified such that the TOB value is within the adjustable threshold, thereby reducing torsional forces applied to the downhole drilling tool. Additionally, if WOB, bending, and TOB values are determined to be within only a fraction (e.g., 25 percent) of each corresponding adjustable threshold, downhole drilling parameters may be modified to increase compression forces (i.e., WOB), bending forces, and torsional forces (i.e., TOB) such that the modified downhole drilling parameters may result in more efficient drilling operations.

Figure 4:
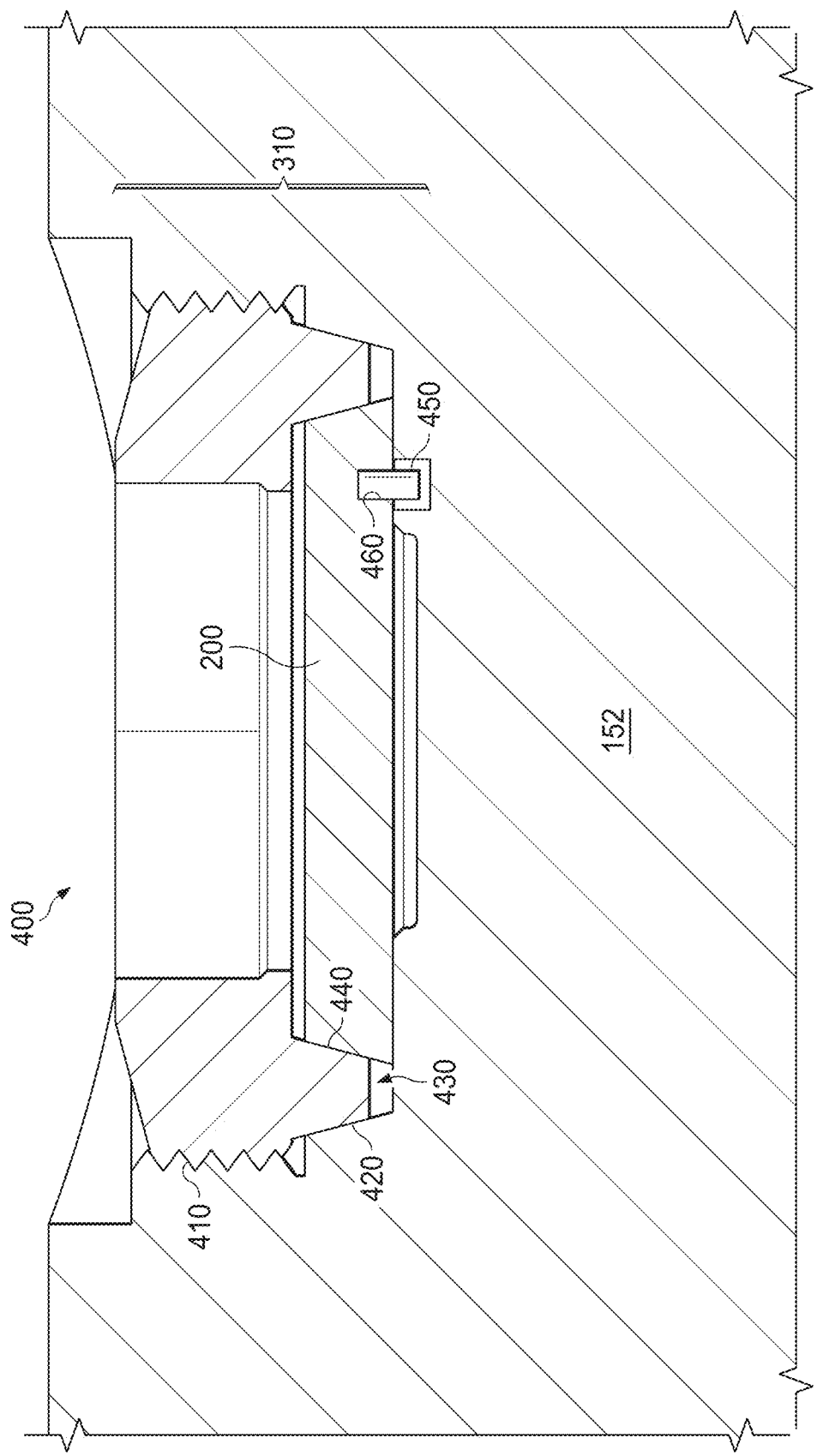
FIG. 4 is a cross-sectional view of an example of a strain puck and a puck wedge coupled to a downhole drilling tool.

FIG. 4 is a cross-sectional view of an example of a strain puck and a puck wedge coupled to a downhole drilling tool. In the example shown in FIG. 4, strain puck 200 is removably coupled to shank 152 of earth-boring drill bit 101 within recessed area 310 of shank 152. Threads 410 of puck wedge 400 may be received by a threaded portion of the surrounding recessed area 310 such that a tightening force may be applied radially inward (i.e., toward shank 152) upon strain puck 200 thereby removably coupling strain puck 200 to shank 152.

As illustrated in FIG. 4, puck wedge 400 may include a chamfered point 430 positioned below threads 410. Chamfered point 430 may be contoured to form a wedge between chamfered edge 440 of strain puck 200 and a chamfered portion 420 of surrounding recessed area 310 within shank 152. Because chamfered point 430 applies a radially inward tightening force upon chamfered edge 440 of strain puck 200, the tightening force may be evenly distributed around the circumference of strain puck 200. This ensures that downhole forces applied to shank 152 may be similarly applied to strain puck 200 and, in turn, to strain gauges disposed thereon.

As further illustrated in FIG. 4, alignment pin 450 may be placed within alignment pin slot 460 of strain puck 200. Alignment pin 450 may be used to ensure that strain puck 200 and the strain gauges disposed thereon are properly aligned within recessed area 310. In particular, alignment pin 450 may be used to couple alignment slot 460 of strain puck 200 with a slotted portion of surrounding recessed area 310. Coupling alignment slot 460 with a slotted portion of surrounding recessed area 310 of shank 152 may ensure that each strain gauge (not expressly shown) disposed on strain puck 200 is properly aligned with the downhole force, or downhole forces, in which the strain gauge is configured to measure.

Figure 5A:
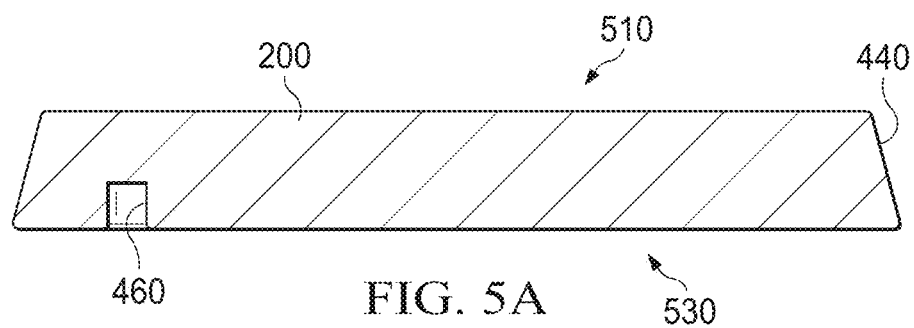
FIG. 5A is a side view of an example of a strain puck of a downhole drilling tool.

FIG. 5A is a side view of an example of a strain puck of a downhole drilling tool. Strain puck 200 may be positioned within a downhole drilling tool (e.g., such as earth-boring drill 101 bit or subassemblies 122 as illustrated in FIG. 1) such that downhole forces applied to the downhole drilling tool during a drilling operation may similarly be applied to strain puck 200. Strain puck 200 includes strain puck surface 510 on which strain gauges (not expressly shown) are disposed. Strain puck 200 may be coupled to a downhole drilling tool in a threaded manner, allowing strain puck 200 to be removed and reattached from the downhole drilling tool without damaging or destroying the strain gauges. For example, strain puck 200 may be easily removed when the downhole drilling tool is removed from the wellbore, for example, during repair, cleaning, or any other suitable maintenance.

In the example illustrated in FIG. 5A, strain puck 200 includes alignment pin slot 460. As shown in FIG. 4, alignment pin slot 460 may be configured to receive an alignment pin 450 to ensure that strain puck 200 is properly aligned with the downhole drilling tool. Proper alignment of strain puck 200 may ensure that strain gauges disposed on strain puck surface 510 collect accurate measurements of the downhole forces applied to the downhole drilling tool during a drilling operation. In particular, alignment pin slot 460 may ensure that each strain gauge disposed on strain puck surface 510 is properly aligned, or calibrated, with the downhole force(s) that the strain gauges are configured to measure. More specifically, each strain gauge may be calibrated to collect measurements of a downhole force without receiving tangential interference from one or more surrounding downhole forces. For example, a strain gauge disposed on strain puck surface 510 to measure compression forces may be oriented vertically along rotational axis 104 shown in FIG. 2 such that compression forces applied to the downhole drilling tool along rotational axis 104 may be accurately measured without receiving interference from torsional forces. In addition, strain gauges may be calibrated on strain puck surface 510 of strain puck 200 prior to strain puck 200 being coupled to a downhole drilling tool. In particular, compression and/or torsional forces may be applied to strain gauges such that a response (e.g., a change in electrical resistance) from each strain gauge may indicate whether the strain gauge is calibrated in a proper alignment with the compression and/or torsional forces. Strain gauges may retain calibration upon being coupled to the downhole drilling tool by properly aligning strain puck 200 using alignment pin slot 460.

In the example illustrated in FIG. 5A, strain puck 200 may include two circular surfaces of different circumferences creating chamfered edge 440 along the side of strain puck 200. Strain puck surface 510 may have a smaller circumference than strain puck base 530 to form a truncated cone. As shown in FIG. 4, chamfered edge 440 along the side of strain puck 200 may receive chamfered point 430 of puck wedge 400 used to removably couple strain puck 200 to shank 152 such that downhole forces applied to shank 152 during a drilling operation may be similarly applied to strain puck 200 and, in turn, the strain gauges disposed thereon. In another example (not expressly shown), strain puck surface 510 may have a larger circumference than strain puck base 330 to form an inverted truncated cone. In this example, the inverted truncated cone may have a chamfered edge 440 along the side of strain puck 200 that may be received by a chamfered portion of a downhole drilling tool (e.g., a chamfered portion of a recessed area of shank 152) such that strain puck 200 may be coupled to the downhole drilling tool along the chamfered edge 440.

Figure 5B:
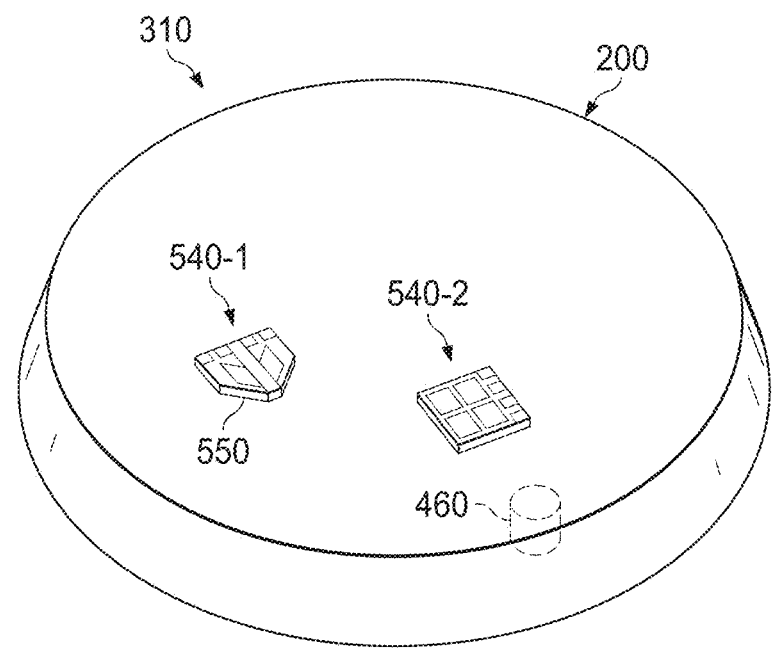
FIG. 5B is an isometric view of an example of a strain puck that includes strain gauges.

FIG. 5B is an isometric view of an example of a strain puck that includes strain gauges. In the example illustrated in FIG. 5B, strain puck 200 includes strain gauges 540-1 and 540-2 (collectively referred to herein as "strain gauges 540") disposed on strain gauge surface 510 for collecting data indicating downhole forces applied to a downhole drilling tool (e.g., earth-boring drill bit 101 and/or subassemblies 122 illustrated in FIG. 1) during a drilling operation. More specifically, downhole forces applied to the downhole drilling tool may be similarly applied to strain puck 200 and, in turn, to strain gauges 540 disposed thereon. Strain gauges 540 may be disposed upon strain puck surface 510 such that the orientation of each strain gauge 540 in relation to the downhole drilling tool is properly aligned with the downhole force(s) applied to the downhole drilling tool. In particular, the orientation of each strain gauge 540 may be aligned with a downhole force in relation to alignment slot 460.

In the example illustrated in FIG. 5B, strain gauge 540-1 measures torsional forces and strain gauge 540-2 measures compression and bending forces. In particular, strain gauge 540-1 may be a torsional strain gauge disposed on strain puck surface 510 such that edge 550 of strain gauge 540-1 is oriented at a forty-five degree angle in relation to a tangent of strain puck surface 510. The tangent of strain puck surface 510 may be perpendicular to the radius of strain puck surface 510 at a point of tangency at alignment slot 460. Given the orientation of strain gauge 540-1 in relation to alignment slot 460, strain gauge 540-1 may be calibrated on strain puck surface 510 to measure torsional forces applied to earth-boring drill bit 101. Strain gauge 540-2 may be an axial strain gauge disposed on strain puck surface 510 such that strain gauge 540-2 is oriented vertically in relation to alignment slot 460 (i.e., along rotational axis 104 shown in FIG. 2). Given the orientation of strain gauge 540-2 in relation to alignment slot 460, strain gauge 540-2 may be calibrated on strain puck surface 510 to measure compression and tensile forces applied to a downhole drilling tool. Therefore, each strain gauge 540 may measure a different downhole force based on an orientation at which the strain gauge 540 is disposed in relation to alignment slot 460 of strain puck 200.

In one example, strain gauges 540 may be equipped with wireless transmitters such that signals received by strain gauges 540 (i.e., downhole forces applied to strain puck 200) may be conveyed to a wireless receiver. More specifically, each strain gauge 540 may include a wireless transmitter that allows the strain gauge 540 to transmit data indicating downhole forces during a drilling operation to a wireless receiver in real-time. For example, each strain gauge 540 disposed on a downhole drilling tool may be equipped with an antenna that allows the strain gauge 540 to wirelessly transmit data indicating compression forces to a wireless receiver. In another example, each strain gauge 540 may include a transmitter wired to a receiver that allows the strain gauge 540 to transmit data indicating downhole forces during a drilling operation in real-time.

In one example, a wireless receiver may be located at well site 106 shown in FIG. 1 such that it may collect data indicating downhole forces applied to a downhole drilling tool during a drilling operation. The wireless receiver receives data transmitted from strain gauges 540 such that the data may be analyzed in real-time to identify downhole forces applied to the downhole drilling tool. For example, data may be analyzed in real-time to identify a compression value, a torsion value, and/or a bending value resulting from downhole forces applied the downhole drilling tool during a drilling operation. By analyzing these downhole forces in real-time, one or more downhole drilling parameters may be modified to yield a set of optimized downhole drilling parameters. Optimized downhole drilling parameters may be used reduce the magnitude of the downhole forces applied to the downhole drilling tool during a drilling operation which may extend the lifetime of the earth-boring drill bit 101 and result in more efficient drilling operations. In addition, optimized downhole drilling parameters may be used to increase the magnitude of the downhole forces applied which may also result in more efficient drilling operations if it is determined that an increased magnitude of downhole force is needed.

In another example, a wireless receiver may be located within the downhole drilling tool such that it may collect the data transmitted by strain gauges 540 within wellbore 114 shown in FIG. 1 to be stored in a memory medium for later analysis. For example, shank 152 shown in FIG. 3 of earth-boring drill bit 101 may house a wireless receiver and a volatile memory medium used to store the received data. In a further example, any one of subassemblies 122*a*, 122*b*, or 122*c* shown in FIG. 1 may house the wireless receiver. The stored data may be read from the memory medium for analysis upon retrieving the downhole drilling tool from wellbore 114 and analyzed to determine a set of optimized downhole drilling parameters for subsequent drilling operations and/or modify design parameters or manufacturing procedures for earth-boring drill bit 101. For example, the stored data may be used in manufacturing procedures to determine the placement of the cutting elements and/or placement of additional controlling features such as depth-of-cut control (DOCC) elements or gauge pads. Such modifications may affect a magnitude of downhole forces (i.e., increased and/or reduced magnitude) applied to the downhole drilling tool during subsequent drilling operations due to a determined set of optimized downhole drilling parameters. Such modifications may also result in an improved overall design of the downhole drilling tool.

The data collected by strain gauges 540 may be analyzed using any of a variety of methods to estimate downhole forces applied to the downhole drilling tool. An adjustment to the downhole drilling tool to modify one or more downhole drilling parameters of a particular drilling operation may be initiated in response to an evaluation of downhole forces (e.g., based on an analysis of data collected by strain gauges 540). The modification of downhole drilling parameters may be initiated by an operator at the surface such as, for example, a human, or a computer-based control system at the surface or downhole. For example, an engineer or equipment operator may provide input or issue a command to the downhole drilling tool indicating that a modification should be made. In response, the downhole drilling tool may output a control signal to cause the adjustment. In one example, a control algorithm executing on the downhole drilling tool, with or without operator intermediation, may be used to initiate a modification of downhole drilling parameters during a drilling operation to optimize downhole drilling parameters without having to remove the downhole drilling tool from the wellbore.

In one example, a controller for drilling system 100 shown in FIG. 1 may automatically determine that a modification should be made to a downhole drilling parameter of a drilling operation. The controller may also initiate the adjustment of the downhole drilling parameters to achieve the desired modification. For example, a downhole drilling tool may receive and analyze feedback from various strain gauges 540 disposed on strain puck 200 reflecting changing conditions for a drilling operation or a change in efficiency associated with the drilling operation to determine whether to modify any of the current downhole drilling parameters of the drilling operation. More specifically, it may be determined that WOB, bending, and/or TOB values, or other parameters indicative of the operational goals of a drilling operation and/or a type or property of mud, a bottom hole assembly (BHA) configuration (e.g., a position of a stabilizer or valve), a configuration of the drill bit (e.g., a position or configuration of an insulator or nozzle), a controllable characteristic of the electrical circuits and/or other components of a pulsed-power tool, and/or another operating parameter of the systems employed to meet the operational goals of the drilling operation should be modified to optimize the drilling operation in response to an observed or predicted change in conditions during the drilling operation.

Figure 6:
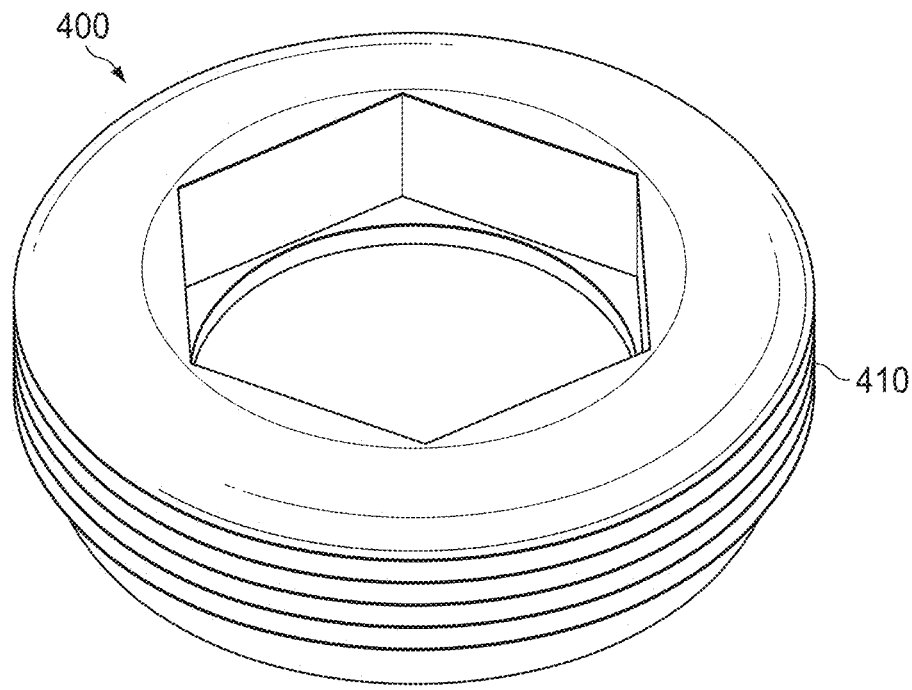
FIG. 6 is an isometric view of an example of a puck wedge of a downhole drilling tool.

FIG. 6 is an isometric view of an example of a puck wedge of a downhole drilling tool. Puck wedge 400 may removably couple strain puck 200 to a downhole drilling tool in a threaded manner such that downhole forces are evenly distributed across strain puck 200 and, in turn, across the strain gauges 540 disposed thereon. In particular, puck wedge 400 may include threads 410 designed to fit within threads located on an exterior surface of the downhole drilling tool to apply an evenly distributed tightening force along threads 410 radially inward upon strain puck 200 to releasably engage strain puck 200 with the downhole drilling tool. For example, threads 410 of puck wedge 400 may be received by threads located on an exterior surface of shank 152 shown in FIG. 2 to apply a tightening force radially inward upon strain puck 200 as puck wedge 400 is screwed into shank 152, thereby removably coupling strain puck 200 to shank 152. In another example, threads 410 of puck wedge 400 may be received by threads located on any one of subassemblies 122 shown in FIG. 1 for removably coupling strain puck 200 to subassembly 122a, 122b, and/or 122c. In yet another example, threads 410 of puck wedge 400 may be received by threads located on a junk slot or fluid flow path 240 shown in FIG. 2 for removably coupling strain puck 200 to a junk slot or fluid flow path 240.

Figure 7:
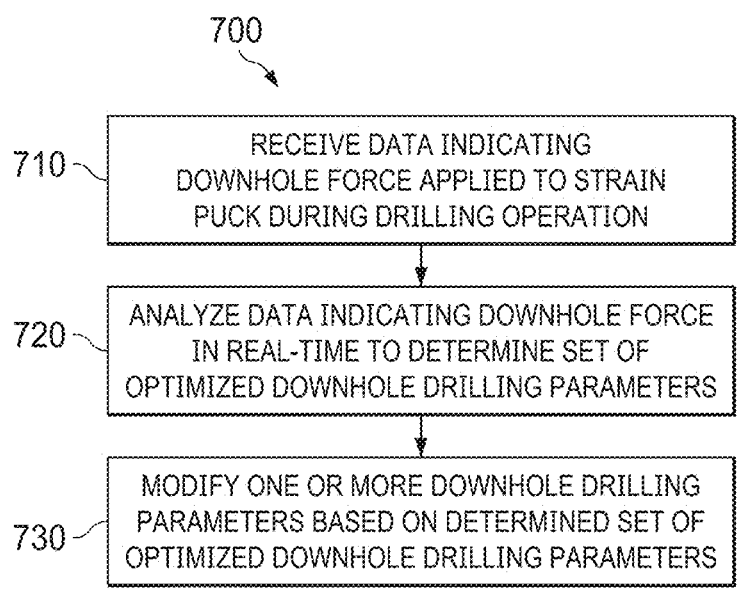
FIG. 7 is a flow chart illustrating an exemplary method for optimizing downhole drilling parameters of a downhole drilling tool.

FIG. 7 is a flow chart illustrating an exemplary method for optimizing downhole drilling parameters of a downhole drilling tool. Method 700 may begin at step 710. In step 710, data indicating a downhole force applied to a strain puck 200 is received during a drilling operation. Strain puck 200 may include a strain gauge 540. For example, strain puck 200 may include strain gauges 540 disposed on strain puck surface 510 as shown in FIG. 5B. Each strain gauge 540 may be calibrated to properly align with the downhole force(s) that the strain gauge 540 is configured to measure. In addition, the strain puck may be removably coupled to a downhole drilling tool. For example, strain puck 200 may be removably coupled to shank 152 as shown in FIG. 3. More specifically, puck wedge 400 may be used to removably couple strain puck 200 to a downhole drilling tool by applying a tightening force radially inward (i.e., toward shank 152 shown in FIG. 3) upon strain puck 200 thereby removably coupling strain puck 200 to the downhole drilling tool.

In step 720, the data indicating the downhole force may be analyzed in real-time to determine a set of optimized downhole drilling parameters during the drilling operation. In particular, the data indicating downhole force applied to strain puck 200 may be collected by strain gauges 540 illustrated in FIG. 5B. In one instance, the data indicating downhole force may be transmitted by strain gauges 540 to a receiver located at the well surface or well site 106 shown in FIG. 1. In another instance, the data indicating downhole force may be transmitted by strain gauges 540 to a receiver housed in a downhole drilling tool, for example, housed in shank 152 illustrated in FIG. 3.

In step 730, one or more downhole drilling parameters may be modified based on the determined set of optimized downhole drilling parameters. For example, downhole drilling parameters such as rotational speed of the earth-boring drill bit in revolutions per minute (RPM), a rate of penetration (ROP), a weight on bit (WOB), a torque on bit (TOB), etc., may be modified as described with respect to FIG. 3. In one example, a person or processor may initiate a modification of downhole drilling parameters based on downhole forces collected by strain gauges 540 during a drilling operation. The downhole forces may include, without limitation, compression forces, bending forces, and/or torsional forces.

In an embodiment A, the present disclosure provides a downhole drilling tool including an earth-boring drill bit that includes: a bit body, a shank coupled to the bit body, a strain puck removably coupled to the earth-boring drill bit, the strain puck including a strain gauge to collect data indicating a downhole force applied to the earth-boring drill bit during a drilling operation, and a plurality of blades disposed on exterior portions of the bit body, with each blade having respective cutting elements disposed thereon.

The present disclosure further provides in an embodiment B a downhole drilling system including a drill bit, and a drill string coupled to the drill bit. The drill string includes a plurality of subassemblies disposed along a length of the drill string, and a strain puck removably coupled to a subassembly of the plurality of subassemblies. The strain puck includes a strain gauge configured to collect data indicating a downhole force applied to the subassembly during a drilling operation.

The present disclosure further provides in an embodiment C a method that includes receiving, from a strain puck including a strain gauge, data indicating a downhole force applied to a downhole drilling tool during a drilling operation. The strain puck may be removably coupled to the downhole drilling tool. The method further includes analyzing the data indicating the downhole force in real-time to determine a set of optimized downhole drilling parameters during the drilling operation, and modifying one or more downhole drilling parameters based on the determined set of optimized downhole drilling parameters.

Each of embodiments A, B, and C may have one or more of the following additional elements in any combination:

Element 1: wherein the strain gauge may be further configured to wirelessly transmit the collected data indicating the downhole force to a receiver to be analyzed in real-time in order to determine a set of optimized downhole drilling parameters during the drilling operation. Element 2: wherein the strain gauge may be further configured to wirelessly transmit the collected data indicating the downhole force to a memory medium to be stored for analysis in order to determine a set of optimized downhole drilling parameters for subsequent drilling operations. Element 3: wherein the earth-boring drill bit includes a second strain puck removably coupled to the earth-boring drill bit, the second strain puck including a second strain gauge configured to collect data indicating a second downhole force applied to the earth-boring drill bit during the drilling operation. Element 4: wherein the collected data indicating the second downhole force applied to the earth-boring drill bit may be analyzed simultaneously with the collected data indicating the downhole force applied to the earth-boring drill bit to determine a set of optimized downhole drilling parameters. Element 5: wherein the strain puck may be removably coupled to the shank in a threaded manner. Element 6: wherein the downhole force applied to the earth-boring drill bit includes at least one of: a compression force, a bending force, and a torsional force. Element 7: wherein the subassembly of the plurality of subassemblies includes a bottom hole assembly (BHA) of the drill string. Element 8: wherein the drill string further includes a second strain puck removably coupled to a second subassembly of the plurality of subassemblies, where the second strain puck includes a second strain gauge configured to collect data indicating a second downhole force applied to the second subassembly during the drilling operation. Element 9: wherein determining the set of optimized downhole drilling parameters includes: identifying a first compression value of the data indicating the downhole force applied to the downhole drilling tool; identifying a second compression value of the data indicating the second downhole force applied to the downhole drilling tool; calculating a weight on bit (WOB) value based on the first compression value and the second compression value; determining whether the calculated WOB value exceeds an adjustable threshold WOB value; and in response to determining that the calculated WOB value exceeds the adjustable threshold WOB value, modifying the WOB value such that it is within the adjustable threshold WOB value. Element 10: wherein determining the set of optimized downhole drilling parameters includes: identifying a compression value of the data indicating the downhole force applied to the downhole drilling tool; identifying a tension value of the data indicating the second downhole force applied to the downhole drilling tool; calculating a bending value based on the compression value and the tension value; determining whether the calculated bending value exceeds an adjustable threshold bending value; and in response to determining that the calculated bending value exceeds the adjustable threshold bending value, modifying the bending value such that it is within the adjustable threshold bending value. Element 11: wherein determining the set of optimized downhole drilling parameters includes: identifying a first torsion value of the data indicating the downhole force applied to the downhole drilling tool; identifying a second torsion value of the data indicating the second downhole force applied to the downhole drilling tool; calculating a torque on bit (TOB) value based on the first torsion value and the second torsion value; determining whether the calculated TOB value exceeds an adjustable threshold TOB value; and in response to determining that the calculated TOB value exceeds the adjustable threshold TOB value, modifying the TOB value such that it is within the adjustable threshold TOB value. Element 12: wherein the one or more downhole drilling parameters include at least one of a rotational speed in revolutions per minute (RPM), a rate of penetration (ROP), a weight on bit (WOB), a torque on bit (TOB), and a depth-of-cut control (DOCC).

Although the present disclosure has been described with several embodiments, various changes and modifications may be suggested to one skilled in the art. For example, although the present disclosure describes configurations of strain pucks with respect to earth-boring drill bits, the same principles may be used to identify downhole forces applied to any suitable downhole drilling tool according to the present disclosure. It is intended that the present disclosure encompasses such changes and modifications as fall within the scope of the appended claims.

What is claimed is:

1. A downhole drilling tool, comprising:
   an earth-boring drill bit including:
      a bit body;
      a shank coupled to the bit body;
      a strain puck removably coupled to the earth-boring drill bit, the strain puck including:
         a strain gauge to collect data indicating a downhole force applied to the earth-boring drill bit during a drilling operation; and
         an edge to receive a tightening force from an interface of a puck wedge to removably couple the strain puck to the earth-boring drill bit; and
      a plurality of blades disposed on exterior portions of the bit body, each blade having respective cutting elements disposed thereon.

2. The downhole drilling tool of claim 1, wherein the strain gauge is further configured to wirelessly transmit the collected data indicating the downhole force to a receiver to be analyzed in real-time in order to determine a set of optimized downhole drilling parameters during the drilling operation.

3. The downhole drilling tool of claim 1, wherein the strain gauge is further configured to wirelessly transmit the collected data indicating the downhole force to a memory medium to be stored for analysis in order to determine a set of optimized downhole drilling parameters for subsequent drilling operations.

4. The downhole drilling tool of claim 1, further comprising:
   a second strain puck removably coupled to the earth-boring drill bit, the second strain puck including a second strain gauge configured to collect data indicating a second downhole force applied to the earth-boring drill bit during the drilling operation.

5. The downhole drilling tool of claim 4, wherein the collected data indicating the second downhole force applied to the earth-boring drill bit may be analyzed simultaneously with the collected data indicating the downhole force applied to the earth-boring drill bit to determine a set of optimized downhole drilling parameters.

6. The downhole drilling tool of claim 1, wherein the strain puck is removably coupled to the shank in a threaded manner.

7. The downhole drilling tool of claim 1, wherein the downhole force applied to the earth-boring drill bit includes at least one of:
   a compression force;
   a bending force; and
   a torsional force.

8. A downhole drilling system, comprising:
   a drill bit; and
   a drill string coupled to the drill bit, the drill string including:
      a plurality of subassemblies disposed along a length of the drill string; and
      a strain puck removably coupled to a subassembly of the plurality of subassemblies, the strain puck including:
         a strain gauge configured to collect data indicating a downhole force applied to the subassembly during a drilling operation; and
         an edge to receive a tightening force from an interface of a puck wedge to removably couple the strain puck to the subassembly.

9. The downhole drilling system of claim 8, wherein the strain gauge is further configured to wirelessly transmit the collected data indicating the downhole force to a receiver to be analyzed in real-time in order to determine a set of optimized downhole drilling parameters during the drilling operation.

10. The downhole drilling system of claim 8, wherein the strain gauge is further configured to wirelessly transmit the collected data indicating the downhole force to a memory medium to be stored for analysis in order to determine a set of optimized downhole drilling parameters for subsequent drilling operations.

11. The downhole drilling system of claim 8, wherein the subassembly of the plurality of subassemblies comprises a bottom hole assembly (BHA) of the drill string.

12. The downhole drilling system of claim 8, wherein the drill string further includes:
   a second strain puck removably coupled to a second subassembly of the plurality of subassemblies, the second strain puck including a second strain gauge configured to collect data indicating a second downhole force applied to the second subassembly during the drilling operation.

13. The downhole drilling system of claim 12, wherein the collected data indicating the second downhole force applied to the second subassembly may be analyzed simultaneously with the collected data indicating the downhole force applied to the subassembly to determine a set of optimized downhole drilling parameters.

14. The downhole drilling system of claim 8, wherein the strain puck is removably coupled to the subassembly of the plurality of subassemblies in a threaded manner.

15. A method comprising:
   receiving, from a strain puck including a strain gauge, data indicating a downhole force applied to a downhole drilling tool during a drilling operation, the strain puck further including an edge to receive a tightening force from an interface of a puck wedge to removably couple the strain puck to the downhole drilling tool;

analyzing the data indicating the downhole force in real-time to determine a set of optimized downhole drilling parameters during the drilling operation; and modifying one or more downhole drilling parameters based on the determined set of optimized downhole drilling parameters.

16. The method of claim 15, further comprising:

receiving, from a second strain puck including a second strain gauge, data indicating a second downhole force applied to the downhole drilling tool during the drilling operation, the second strain puck removably coupled to the downhole drilling tool;

analyzing the data indicating the second downhole force applied to the downhole drilling tool with the data indicating the downhole force applied to the downhole drilling tool simultaneously to determine the set of optimized downhole drilling parameters; and modifying the one or more downhole drilling parameters based on the determined set of optimized downhole drilling parameters.

17. The method of claim 16, wherein determining the set of optimized downhole drilling parameters comprises:

identifying a first compression value of the data indicating the downhole force applied to the downhole drilling tool;

identifying a second compression value of the data indicating the second downhole force applied to the downhole drilling tool;

calculating a weight on bit (WOB) value based on the first compression value and the second compression value;

determining whether the calculated WOB value exceeds an adjustable threshold WOB value; and in response to determining that the calculated WOB value exceeds the adjustable threshold WOB value, modifying the WOB value such that it is within the adjustable threshold WOB value.

18. The method of claim 16, wherein determining the set of optimized downhole drilling parameters comprises:

identifying a compression value of the data indicating the downhole force applied to the downhole drilling tool;

identifying a tension value of the data indicating the second downhole force applied to the downhole drilling tool;

calculating a bending value based on the compression value and the tension value;

determining whether the calculated bending value exceeds an adjustable threshold bending value; and in response to determining that the calculated bending value exceeds the adjustable threshold bending value, modifying the bending value such that it is within the adjustable threshold bending value.

19. The method of claim 16, wherein determining the set of optimized downhole drilling parameters comprises:

identifying a first torsion value of the data indicating the downhole force applied to the downhole drilling tool;

identifying a second torsion value of the data indicating the second downhole force applied to the downhole drilling tool;

calculating a torque on bit (TOB) value based on the first torsion value and the second torsion value;

determining whether the calculated TOB value exceeds an adjustable threshold TOB value; and in response to determining that the calculated TOB value exceeds the adjustable threshold TOB value, modifying the TOB value such that it is within the adjustable threshold TOB value.

20. The method of claim 15, wherein the one or more downhole drilling parameters include at least one of a rotational speed in revolutions per minute (RPM), a rate of penetration (ROP), a weight on bit (WOB), a torque on bit (TOB), and a depth-of-cut control (DOCC).

* * * * *